United States Patent
Chance et al.

(10) Patent No.: US 11,333,270 B2
(45) Date of Patent: May 17, 2022

(54) HOSE SECURING DEVICE

(71) Applicant: BIGROCK INNOVATIONS LLC, Marina del Rey, CA (US)

(72) Inventors: Allen Chance, Los Angeles, CA (US); William Gray, Los Angeles, CA (US)

(73) Assignee: BIGROCK INNOVATIONS LLC, Marina Del Rey, CA (US)

( * ) Notice: Subject to any disclaimer, the term of this patent is extended or adjusted under 35 U.S.C. 154(b) by 0 days.

(21) Appl. No.: 16/949,713

(22) Filed: Nov. 11, 2020

(65) Prior Publication Data
US 2021/0140565 A1    May 13, 2021

Related U.S. Application Data (60) Provisional application No. 62/933,865, filed on Nov. 11, 2019.

(51) Int. Cl.
  *F16L 3/12* (2006.01)
  *B60P 3/36* (2006.01)

(52) U.S. Cl.
  CPC ............ *F16L 3/1211* (2013.01); *B60P 3/36* (2013.01)

(58) Field of Classification Search
  CPC ......... B60P 3/36; B60P 3/2265; F16L 3/1211; F16L 3/003; F16L 3/02; F16L 37/148; F16L 21/06; F16L 33/03; F16L 33/02; F16L 33/32; F16L 37/26; F16L 5/10; F16L 5/00; F16L 5/027

USPC .................... 141/383, 382; 248/79
  See application file for complete search history.

(56) References Cited

U.S. PATENT DOCUMENTS

| | | | | |
|---|---|---|---|---|
| 2,047,580 A * | 7/1936 | Dewey | ............... | B67D 7/421 141/285 |
| 2,058,118 A * | 10/1936 | White | ............... | B67D 7/421 141/392 |
| 2,111,031 A * | 3/1938 | Newton | ........... | B60K 15/0406 141/285 |
| 2,653,747 A * | 9/1953 | Maida | ............... | B67D 7/421 141/392 |
| 5,702,076 A * | 12/1997 | Humber | ........... | F16L 5/00 248/56 |
| 5,899,249 A * | 5/1999 | Armellino | ......... | B63B 25/082 141/382 |
| 7,013,934 B1 * | 3/2006 | Hicok | ............... | B65B 39/00 141/297 |
| 9,187,307 B2 * | 11/2015 | Fox | ................ | B67C 11/02 |
| 9,233,823 B2 * | 1/2016 | Fox | ................ | B67C 11/02 |
| 9,784,385 B1 * | 10/2017 | Striebel | ........... | F16L 3/1218 |

* cited by examiner

*Primary Examiner* — Christopher Garft
(74) *Attorney, Agent, or Firm* — Messner Reeves LLP (57) ABSTRACT

A device for securing a hose to a holding tank is disclosed. The device includes a sleeve with a cleft running through it; a central aperture for holding a hose, an entry section for inserting the device into a mouth of the holding tank, a shield which covers the mouth of the holding tank, and a haft and pommel to assist with placement and removal of the device. The cleft enables a circumference of the central aperture to be increased or decreased and allows an outer circumference to be increased or decreased. In one embodiment, at least one thread engagement knob secures the entry section to the mouth of the holding tank.

20 Claims, 6 Drawing Sheets

HOSE SECURING DEVICE

CROSS-REFERENCE TO RELATED APPLICATIONS

This application claims priority to U.S. Provisional Patent No. 62/933,865 which was filed on Nov. 11, 2019.

TECHNICAL FIELD

This application relates to liquid delivery systems.

BACKGROUND

Boats, RV and other portable vehicles, particularly those used for living on for multiple days, require potable water to be carried onboard. Often boats or RV's are designed to accommodate living aboard for multiple days and include built in water tanks. Most often these tanks are filled using a hose. The most common hose used to fill the tanks are garden hoses or garden-type hoses. When placed into the water tank opening and left, the pressure in the hose causes the hose to pop out of the opening for the water tank. The usual method for combating the hose popping out of the opening is for a user to hold the hose. Many water tanks are large, and even at full pressure it often requires a substantial amount of time to fill the tank.

SUMMARY

In a first aspect, the disclosure provides A device for securing a hose to a holding tank which includes: a sleeve, where the wall of the sleeve is interrupted by a cleft; a central aperture for holding a hose; an entry section for inserting into a mouth of the holding tank comprising at least one thread engagement knob; a shield which covers the mouth of the holding tank; and a haft and pommel. The cleft enables a circumference of the central aperture to be increased or decreased and allows an outer circumference to be increased or decreased. The at least one thread engagement knob secures the entry section to the mouth of the holding tank.

In a second aspect the disclosure provides a device for securing a hose to a holding tank made up of: a sleeve; a cleft which interrupts the wall of the sleeve, comprising a first face and a second face; a central aperture for holding a hose; an entry section for inserting into a mouth of the holding tank comprising at least one thread engagement knob; and a haft and pommel. The cleft enables a circumference of the central aperture to be increased or decreased and allows an outer circumference to be increased or decreased. The at least one thread engagement knob secures the entry section to the mouth of the holding tank. The width of the cleft can be increased by putting pressure on the first face and the second face of the cleft. After the pressure on the faces of the cleft has been released, the width of the cleft returns to its original width. The outer circumference of the entry section is decreased by squeezing the wall of the sleeve and bringing the first face and the second face of the cleft closer together. Once the faces of the cleft are no longer squeezed together the outer circumference of the entry section returns to its original circumference.

Further aspects and embodiments are provided in the foregoing drawings, detailed description, and claims.

BRIEF DESCRIPTION OF THE DRAWINGS

The drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

To keep a hose in place during the filling of liquid tanks a hose securing device attaches to the hose and holds the hose in place within the tank opening. The hose securing device attaches to a hose, typically a garden hose, by sliding the hose securing device onto the hose. First the hose is squeezed tight and the hose securing device is slid around the hose. The hose securing device is an incomplete tube, where instead of the tube forming a complete ring, a cleft interrupts the closure of the tube. The cleft enables the hose securing device to be slid around the hose. As the hose is slid through the cleft, the cleft is opened wider by putting pressure on the walls to either side of the cleft of the hose securing device. Once the hose securing device is attached to the hose, the hose tip is fed into the mouth of the water tank. The hose securing device is then squeezed, causing the walls of the cleft to draw closer together, and narrowing the overall profile of the hose securing device. The hose securing device is pushed into the mouth of the tank while being squeezed. As the pressure on the hose securing device is released the hose securing device springs back to its original circumference and engages with the sides of the mouth of the water tank. The hose securing device includes raised ridges on the tip that enters the mouth of the tank. The raised ridges engage with the lip inside or under the mouth of the tank, or with the threads of the mouth of the tank, and hold the hose securing device in place which holds the hose in place.

Figure 1:
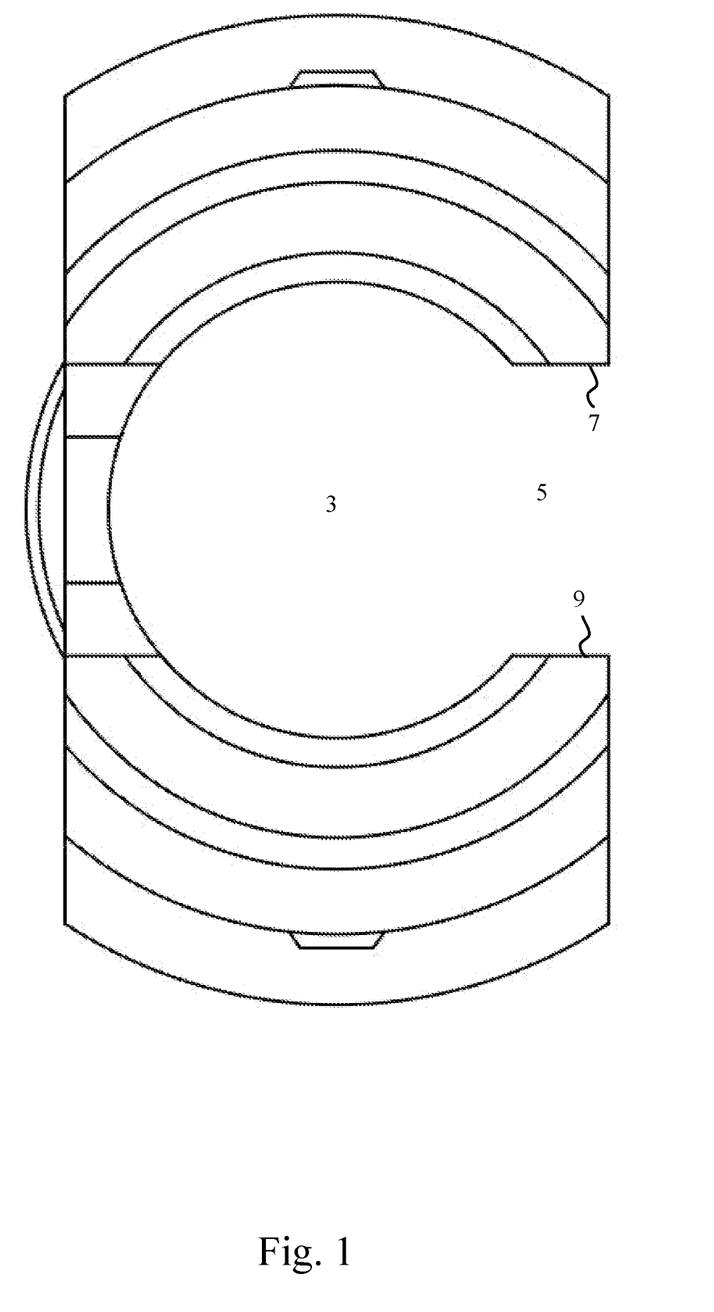
FIG. 1 is a top down perspective view of the hose securing device of the present invention.

Now referring to FIG. 1 which shows a top down view of one embodiment of the hose securing device. The hose securing device is a sleeve, where a cleft 5 interrupts the continuity of the wall of the sleeve and is designed to fit around a hose. When looking at either end of the hose securing device it appears as a letter "C." The walls of the sleeve do not form a complete ring around a central aperture 3. The central aperture 3 is designed for a hose to sit within it. The cleft 5 in the wall enables the device to be attached to a hose and the shape of the hose securing device to be manipulated to fit within the opening of a water tank. Where the wall of the hose securing device is incomplete, first face 7 of the wall is opposite second face 9 of the wall, and cleft 5 is the area between first face 7 and second face 9. The device includes materials such that faces 7 and 9 can be pulled apart to increase the width of cleft 5. Increasing the width of the cleft 5 assists in sliding the sleeve onto a hose. This increases the overall circumference of the device and increases the circumference of the central aperture 3. When the pressure on faces 7 and 9 is released, the material of the device causes the device to return to its original shape and circumference. The wall of the device can be squeezed thus bringing first face 7 closer to second face 9 and decreasing the circumference of the central aperture 3 and the overall circumference of the device.

Figure 2:
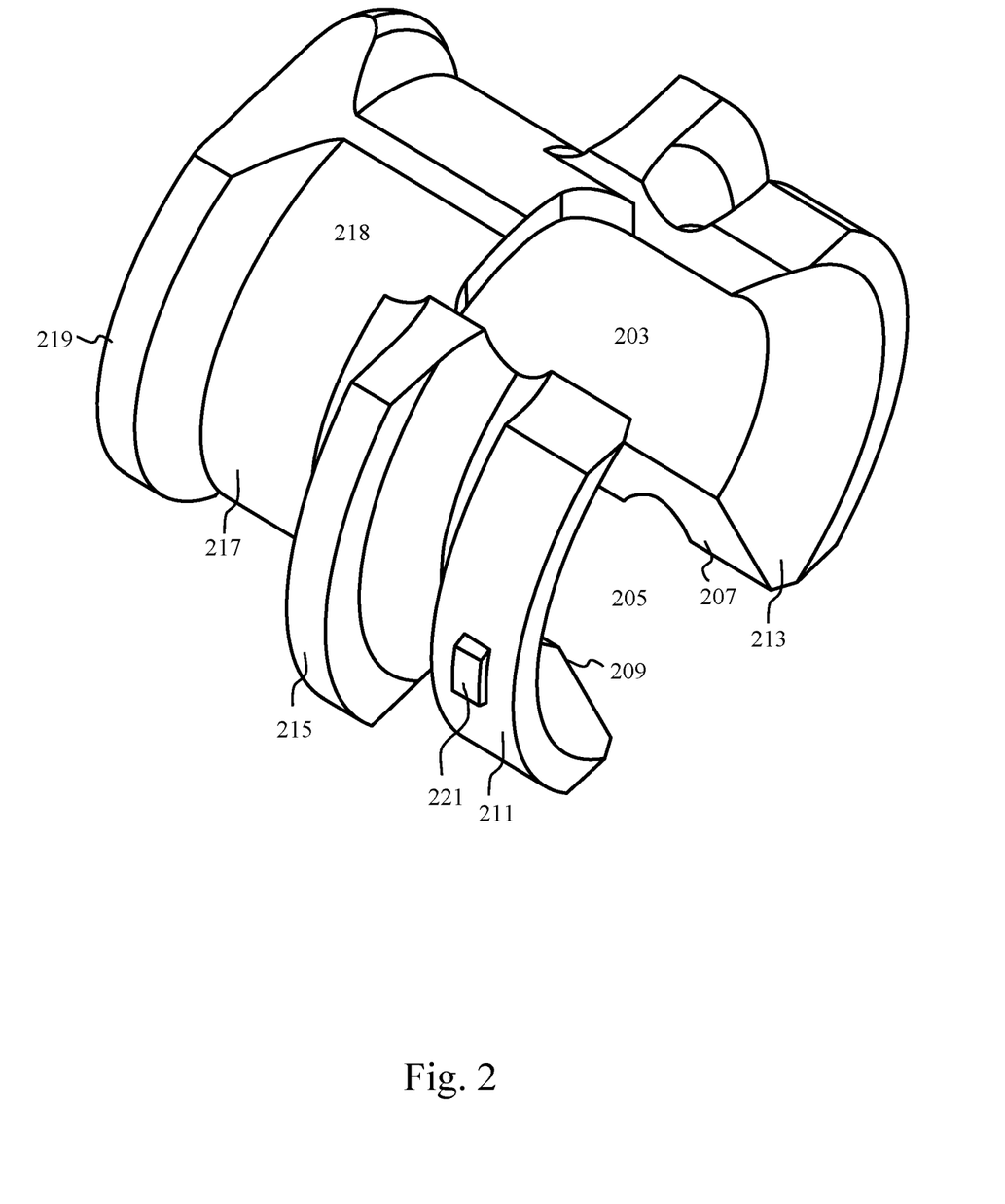
FIG. 2 is a perspective view of the hose securing device of the present invention.

In addition to holding a hose, the hose securing device engages with a holding tank, most commonly the holding tank is for water, though other substances and tanks are envisioned. Referring to FIG. 2, which is a perspective view of the hose securing device. The hose securing device has three functional sections. A handle or grasping section 218, a shield section 215, and an entry section 211.

The entry section 211 is a portion that fits within the mouth of a holding tank. This portion is sized to fit within the mouth of a holding tank. The majority of water tanks are constructed with the same opening, so the entry section 211 of the hose securing device for use with water tanks will have a standard circumference. A ridge 221 is located on the entry section. The ridge 221 is a thread engagement knob that fits within or engages with the threads in the mouth of the holding tank. The ridge 221 assists in holding the hose securing device in place. The ridge 221 is designed so that it fits within the groove of the threaded portion of the mouth of the holding tank. When the ridge 221 is properly fit within the threads of the mouth of the holding tank, the hose securing device will not pop out of the mouth of the holding tank. In most embodiments of the device, the tread engagement knob 221 is molded into the entry section 211 and are made from the same material as the rest of the device. In some embodiments, the thread engagement knob 221 is made from an alternative material. Some of these alternative materials are rubber, silicone, a plastic having a different durometer than the plastic of the device, and metal.

The shield section has a shield 215 larger than the circumference of the mouth of the holding tank. The shield 215 helps to close the mouth off from other substances entering the holding tank while the tank is being filled.

The handle section 218 assists in removing the hose securing device from the mouth of the holding tank. A pommel 219 sits at the end of the device. The pommel has a greater circumference than the haft 217. The pommel 219 increases the ability to pull the hose securing device from the mouth of the holding tank.

The central aperture 203 traverses the entire length of the device. The central aperture 203 is sized to accommodate a hose. The central aperture 203 is designed so that a hose held within it can slide along the length of the device. The end of the central aperture 203 that faces the mouth of the holding tank is wider than the central aperture. This nozzle grip 213 stops the nozzle of the hose from sliding into the central aperture 203 and out of the device. In this embodiment, the nozzle grip 213 is angled where the end of the nozzle grip 213 closest to the central aperture is the narrowest portion and the nozzle grip 213 widens toward the end of the device. A hose nozzle will be held in the nozzle grip 213 somewhere along this angle. The cleft 205 also traverses the entire length of the device. The cleft 205 is where a hose is pushed into the device. The faces 207 and 209 are pulled apart to increase the width of the cleft 205, which allows a hose to more easily enter the central aperture 203 of the device.

During use, the hose securing device is pried open to increase the width of the cleft 205 and the hose is squeezed to decrease the circumference of the hose into the entry section 211 to enable the entry section 211 to be pushed into or pulled from the mouth of a holding tank. The hose securing device returns to its original shape after being pried apart or squeezed together. These prying and squeezing forces exert stress on the material of the device. The preferred material for the device is plastic. The most preferred material is Acetyl Plastic. In other embodiments the material is any of a variety of plastics. In yet other embodiments the material is metal.

Figure 3:
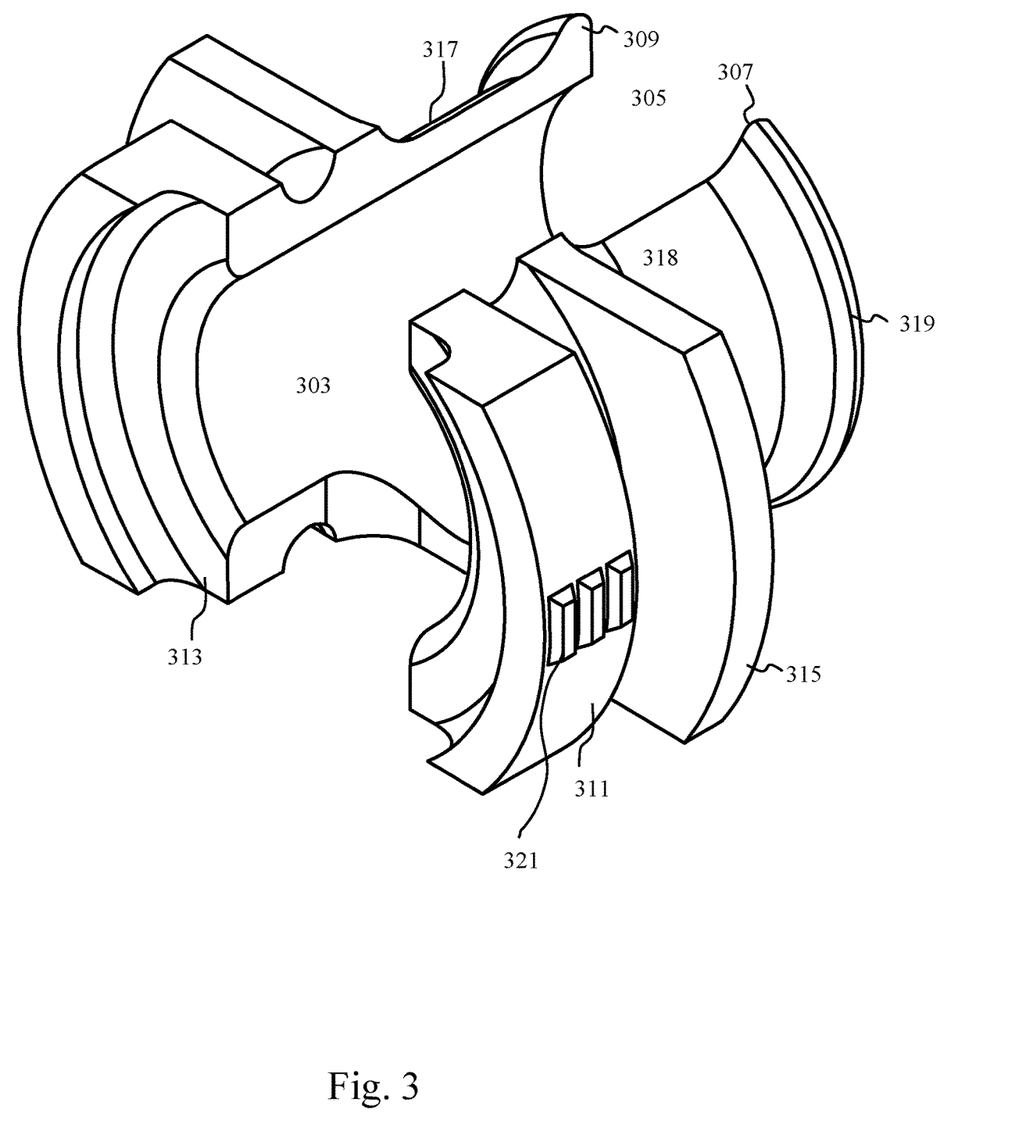
FIG. 3 is another perspective view of the hose securing device of the present invention.

Referring to FIG. 3, which is another perspective view of the hose securing device. The cleft 305 traverses the entire length of the device. The cleft 305 allows a hose to be pushed into the central aperture 303 of the device. The faces 307 and 309 are pulled apart to increase the width of the cleft 305, which allows a hose to more easily enter the central aperture 303 of the device. The central aperture 303 traverses the entire length of the device. The central aperture 303 is sized to accommodate a hose, typically a garden hose, though other embodiments are designed to accommodate other hoses. The central aperture 303 is designed so that a hose held within it can slide along the length of the device. The end of the central aperture 303 that faces the mouth of the holding tank is wider than the central aperture, this nozzle shelf 313 stops the nozzle of the hose from sliding into the central aperture 303 and out of the device. In this embodiment, the nozzle shelf 313 is wider than the central aperture and holds the nozzle of a hose in place. The nozzle slides into place within the nozzle shelf 313 and cannot enter the central aperture. The sides of the nozzle shelf also hold the nozzle in place.

The shield section has a shield 315 larger than the circumference of the mouth of the holding tank. The shield 315 helps to close the mouth off from other substances entering the holding tank while the tank is being filled.

The handle section 318 assists in inserting the hose securing device into and removing the device from the mouth of a holding tank. A pommel 319 sits at the end of the device. The pommel has a greater circumference than the haft 317. The pommel 319 increases the ability to pull the hose securing device from the mouth of the holding tank. When pressure is placed on first face 307 and second face 309 the width of the cleft 305 is increased. By increasing the width of the cleft 305 a hose is more easily slid through the cleft 5 and into the central aperture 303. When a hose is in place in the central aperture, pressure on first face 307 and second face 309 is released, and the device returns to its original shape and circumference. Once a hose is seated in the central aperture 303 the handle section 318 is squeezed. Squeezing the handle section 318 decreases the outer circumference of the entire device, including the entry section 311. The decrease in the outer circumference of the entry section 311 enables the entry section 311 to be inserted into a mouth of a holding tank.

The entry section 311 is a portion that fits within the mouth of a holding tank. This portion is sized to fit within the mouth of a holding tank. The majority of water tanks are constructed with the same opening, so the entry section 311 of the hose securing device for use with water tanks will have a standard circumference. A ridge 321 is located on the entry section. The ridge 321 is a thread engagement protuberance that fits within or engages with the threads in the mouth of the holding tank. The ridge 321 assists in holding the hose securing device in place. The ridge 321 is designed so that it fits within the groove of the threaded portion of the mouth of the holding tank. When the ridge 321 is properly fit within the threads of the mouth of the holding tank, the hose securing device will not pop out of the mouth of the holding tank. This embodiment utilizes multiple ridges to engage with the threads. Multiple ridges enable a more secure hold. In this embodiment, there are three ridges on one side of the entry section 311. Other embodiments utilize other numbers of ridges, preferably there are between one and 5 ridges per side. More preferably there are between one and four ridges per side. Most preferably there are between two and three ridges per side of the entry section.

Figure 4:
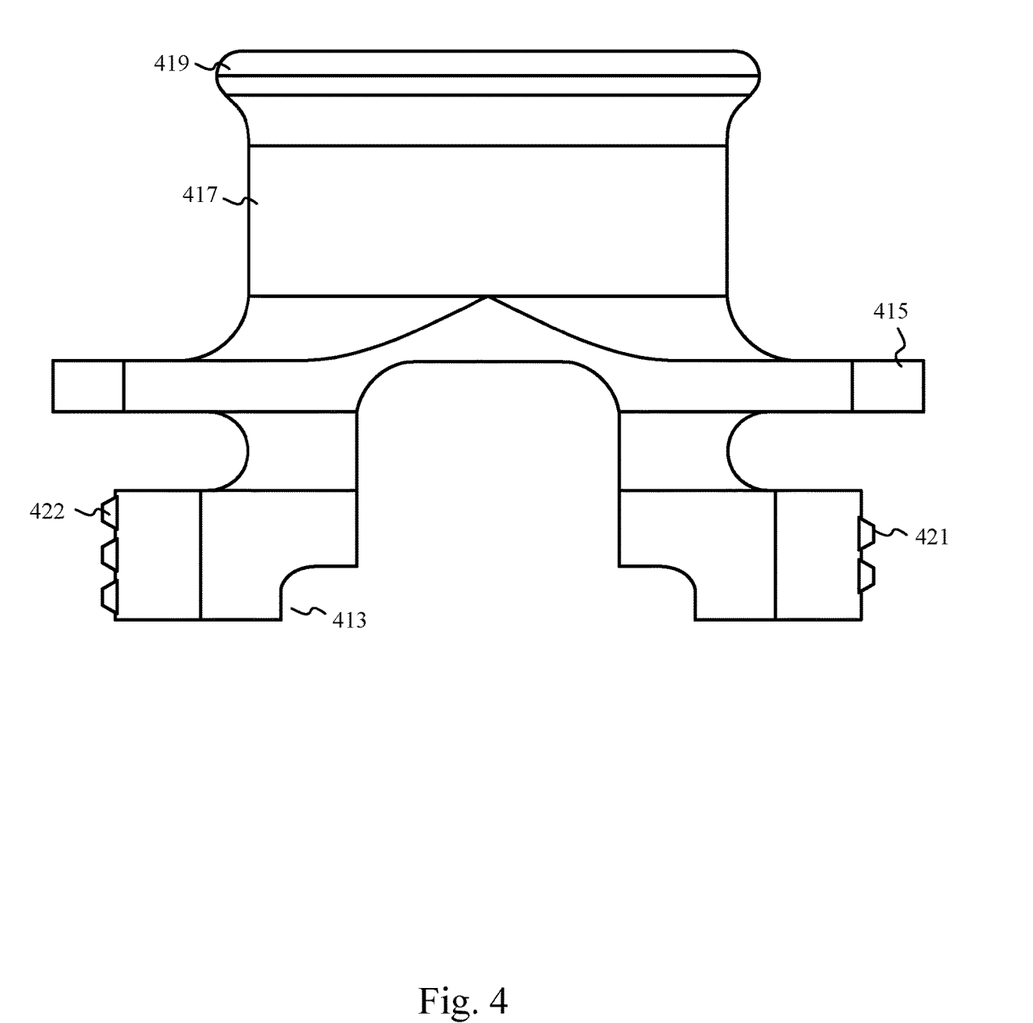
FIG. 4 is a profile view of the hose securing device of the present invention.

Each of the sections of the securing device are sized to fulfill their specific functions. The profile view of FIG. 4 shows the sizes of each section relative to each other. The shield 415 has the largest circumference, which enables it cover much of the mouth of a holding tank. By covering much of the mouth of the holding tank, the shield 415 protects the contents of the holding tank from contamination. The entry section 413 is sized so that it fits snuggly within the mouth of a holding tank. By fitting snuggly within the mouth of a holding tank, the ridges, such as ridges 421 and 422 are enabled to fit within the treads of a holding tank and keep the hose securing device in place. As can be seen in this embodiment there are two ridges on one side and three ridges on the other side of the entry section 413. Ridges, or thread engagement knobs 421 and 422 are located opposite one another on the outside of the entry section. The haft 417 is the narrowest section of the device. This is where a user holds onto the device. In most embodiments the haft 417 is smooth. In some alternate embodiments, the haft is textured. The texture gives additional contact grip so that the haft is less likely to slip when grasped. In some embodiments, the texture is knurled, in other embodiments the texture is raised domes. The pommel 219 gives the user a better grip to pull the device out of the mouth of a holding tank.

Figure 5:
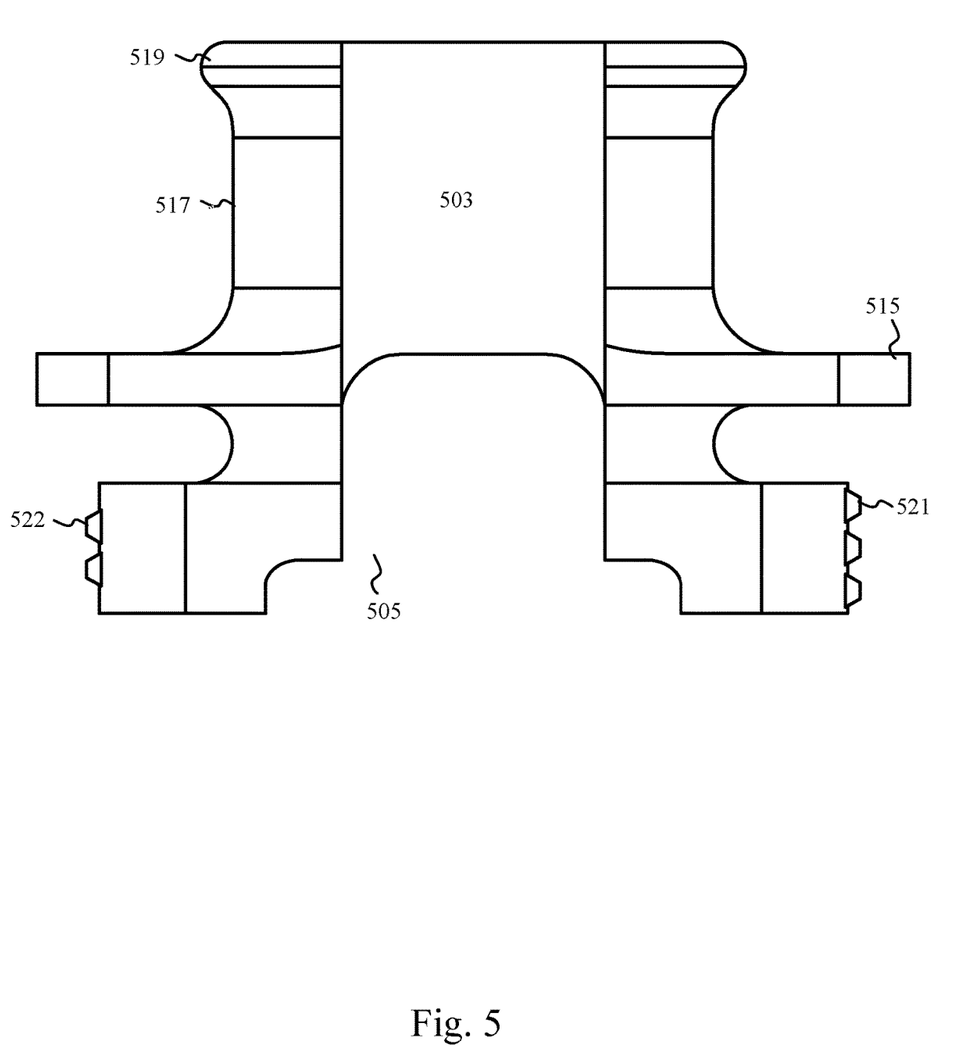
FIG. 5 is a profile view of the hose securing device of the present invention from the other side of the device shown in FIG. 4.

The profile view of FIG. 5 shows the device from the other side of FIG. 4 and demonstrates the sizes of each section relative to each other. The shield 515 has the largest circumference, which enables it cover much of the mouth of a holding tank. By covering much of the mouth of the holding tank, the shield 515 protects the contents of the holding tank from contamination. The entry section 513 is sized so that it fits snuggly within the mouth of a holding tank. By fitting snuggly within the mouth of a holding tank, the ridges, such as ridges 521 and 522 are enabled to fit within the treads of a holding tank and keep the hose securing device in place. As can be seen in this embodiment there are two ridges on one side and three ridges on the other side if the entry section 513. The haft 517 is the narrowest section of the device. This is where a user holds onto the device. The pommel 519 gives the user a better grip to pull the device out of the mouth of a holding tank. The cleft 505 traverses the length of the device and allows a hose to be pushed into the central aperture 503.

Figure 6:
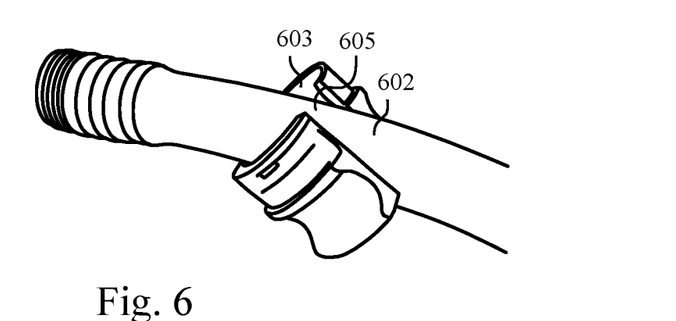
FIG. 6 shows the hose securing device of the present invention interacting with a hose.
Figure 7:
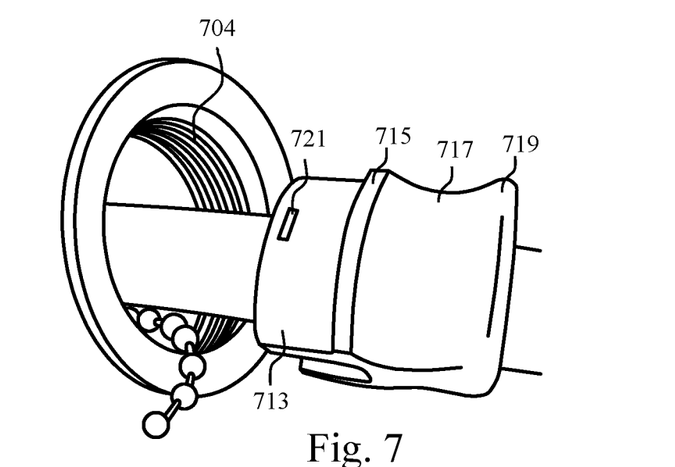
FIG. 7 shows the hose securing device of the present invention prior to engagement with a tank opening.
Figure 8:
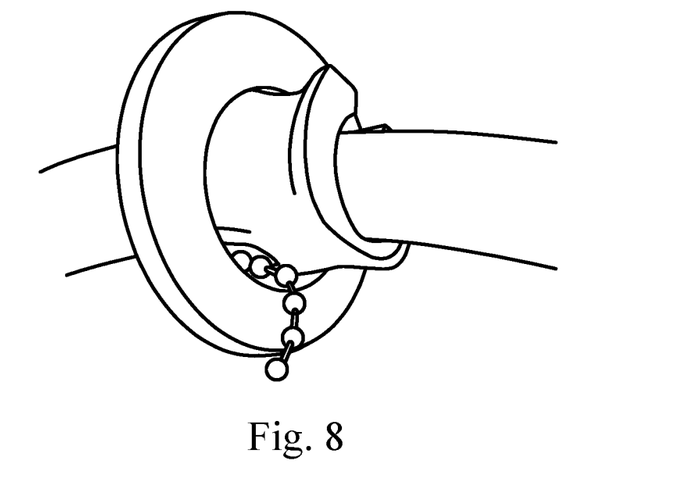
FIG. 8 shows the hose securing device of the present invention interacting with a tank opening.

FIGS. 6, 7, and 8 show the device being attached to a hose and then inserted into the mouth of a holding tank. Referring to FIG. 6, a hose 602 is pushed through the cleft 605 into the central aperture 603. Once the hose is within the central aperture 603 the device can slide along the length of the hose. In some instances, it is desirable to have the nozzle of the hose in contact with the device, as this keeps the nozzle secure and does not allow any movement of the tip of the hose. In other circumstances it is desirable to feed the hose further down the neck of a holding tank so that the nozzle is closer to the body of the holding tank.

Once the hose securing device has been attached to the hose, as shown in FIG. 7, the hose securing device is inserted into the mouth of the holding tank, as shown in FIG. 8. The device is squeezed so that the cleft is narrowed, and the circumference of the entry section 713 is decreased. The device is inserted into the mouth of the holding tank until the shield 715 covers the mouth of the holding tank. When the entry section 713 is within the mouth of the holding tank, the device is released and the ridge 721 fits within the threads 704 of the mouth of the holding tank. The haft 717 and pommel 719 enable the device to be held and squeezed, and then removed when the tank has been filled.

The hose securing device has been described in connection with a tank such as a water tank, and a hose such as a garden hose. The use of the hose securing device is not confined to use with water tanks and water hoses. The hose securing device is also usable with other types of tanks and hoses, some alternatives include fuel tanks and fuel hoses.

All patents and published patent applications referred to herein are incorporated herein by reference. However, any reference to prior publication is not, and should not be taken as an acknowledgement, admission, or suggestion that the prior publication, or any information derived from it is part of the general common knowledge in the field of endeavor to which this specification relates. The invention has been described with reference to various specific and preferred embodiments and techniques. Nevertheless, it is understood that many variations and modifications may be made while remaining within the spirit and scope of the invention.

What is claimed is:

1. A device for securing a hose to a tank, the device comprising;
   a sleeve, wherein a wall of the sleeve is interrupted by a cleft;
   a central aperture for holding a first portion of the hose, wherein the hose includes a nozzle at a distal end of the hose;
   an entry section for inserting into a mouth of the tank, wherein the entry section includes a thread engagement knob on an outer surface of the entry section and a nozzle shelf, wherein a first diameter of a first portion of the central aperture that comprises the nozzle shelf is greater than a second diameter of a second portion of the central aperture that does not comprise the nozzle shelf and wherein the nozzle shelf is configured to receive the nozzle of the hose, wherein a diameter of the nozzle of the hose is greater than the second diameter and less than the first diameter and the diameter of the nozzle of the hose is greater than a third diameter of the first portion of the hose;
   a shield to cover the mouth of the tank; and
   a haft and pommel;
   wherein the cleft enables a pressure applied on the device to temporarily decrease a width of the cleft and a circumference of the central aperture; and
   wherein:

when the pressure is applied on the device to decrease the circumference of the central aperture, the entry section of the device can be inserted into the mouth of the holding tank, and when the entry section of the device is inserted into the mouth of the holding tank and the pressure is not applied on the device, the width of the cleft and the circumference of the central aperture increase and the thread engagement knob is biased against a threaded interior surface of the mouth of the holding tank to secure the entry section to the mouth of the holding tank.

2. The device of claim 1, further comprising multiple thread engagement knobs.

3. The device of claim 2, wherein at least two of the multiple thread engagement knobs are located opposite to one another on the entry section.

4. The device of claim 1, wherein the width of the cleft can be increased by putting pressure on a first face and a second face of the cleft.

5. The device of claim 1, wherein the device is made of a material that allows the cleft to return to its original width after the central aperture has been increased in width.

6. The device of claim 1, wherein the device is made of a material that allows the central aperture to return to its original width after the central aperture has been decreased in width.

7. The device of claim 1, wherein the thread engagement knob is made of a different material than a remainder of the device.

8. The device of claim 1, wherein the device is made of plastic.

9. The device of claim 8, wherein the plastic is acetyl plastic.

10. The device of claim 1, wherein the central aperture is adapted to fit a garden hose.

11. A device for securing a hose to a tank, the device comprising;
a sleeve;
a cleft that interrupts a wall of the sleeve, comprising a first face and a second face;
a central aperture for holding the hose;
an entry section for inserting into a mouth of the tank, wherein the entry section includes a thread engagement knob on an outer surface of the entry section and a nozzle shelf, wherein a first diameter of a first portion of the central aperture that comprises the nozzle shelf is greater than a second diameter of a second portion of the central aperture that does not comprise the nozzle shelf and wherein the nozzle shelf is configured to receive a nozzle of the hose, wherein a diameter of the nozzle of the hose is greater than the second diameter and less than the first diameter; and
a haft and pommel;
wherein the cleft enables a circumference of the central aperture to be increased or decreased;
wherein the thread engagement knob secures the entry section to the mouth of the holding tank;
wherein a width of the cleft can be increased by putting pressure on the first face and the second face of the cleft;
wherein the width of the cleft returns to its original width after the pressure on the faces of the cleft has been released;
wherein an outer circumference of the entry section is decreased by squeezing the first face and the second face of the cleft closer together; and
wherein the outer circumference of the entry section returns to its original circumference when the faces of the cleft are no longer being squeezed together so that when the entry section of the device is inserted into the mouth of the holding tank and the pressure is not applied on the entry section, the thread engagement knob is biased against a threaded interior surface of the mouth of the holding tank to secure the entry section to the mouth of the holding tank.

12. The device of claim 11, further comprising a shield to cover the mouth of the tank.

13. The device of claim 11, further comprising multiple thread engagement knobs.

14. The device of claim 13, wherein at least two thread engagement knobs are located opposite to one another on the entry section.

15. The device of claim 11, wherein the device is made of plastic.

16. The device of claim 15, wherein the plastic is acetyl plastic.

17. The device of claim 11, wherein the holding tank is a water tank.

18. The device of claim 11, wherein the hose is a garden type hose.

19. The device of claim 11, wherein the thread engagement knob is made of a different material than a remainder of the device.

20. The device of claim 13, wherein the thread engagement knobs are made of a different material than a remainder of the device.

* * * * *